United States Patent
Lutz et al.

[11] 3,737,194
[45] June 5, 1973

[54] LIFTING AND CLAMPING DEVICE FOR RIGID RIDING ROOFS OF AUTOMOBILES

[75] Inventors: Alfons Lutz, Krailling; Georg Kandler, Germering, both of Germany

[73] Assignee: Webasto-Werk W. Baier KG, Stockdorf b. Munich, Germany

[22] Filed: Jan. 29, 1971

[21] Appl. No.: 111,050

[30] Foreign Application Priority Data
Mar. 11, 1970 Germany............P 20 11 421.0

[52] U.S. Cl. ............................................296/137 E
[51] Int. Cl. .................................................B60j 7/10
[58] Field of Search .................296/137 E, 137 F, 296/137 G; 49/209

[56] References Cited
UNITED STATES PATENTS
3,610,683  10/1971  Vermenlen ..................296/137 E FOREIGN PATENTS OR APPLICATIONS
1,159,784  12/1963  Germany .....................296/137 E Primary Examiner—Leo Friaglia
Assistant Examiner—Robert R. Song
Attorney—Otto John Munz

[57] ABSTRACT

A lifting and clamping device for rigid sliding roofs of vehicles wherein, in a slidable roof panel two brake rods are provided which are movable transversely to the direction of the sliding movement of the panel and where with aid of the two levers the rear end of the panel can be raised and lowered when the panel can in the closed position. The levers are articulated with one end to one of said brake rods, the other end of the levers co-operating with fixed support means for said raising and lowering of the panel. Each lever has a finger extending in the direction of the panel-closing movement, co-operating with a cutout in said support means; and may be fitted with a spring biasing it toward the brake rods.

9 Claims, 2 Drawing Figures

Inventors:
Alfons Lutz
Georg Kandler
by *[signature]*
Attorney

LIFTING AND CLAMPING DEVICE FOR RIGID RIDING ROOFS OF AUTOMOBILES

BACKGROUND OF THE INVENTION

1. Field of the Invention

The invention relates to sliding roofs for automobiles, and in particular to lifting and clamping, devices for rigid sliding roofs of vehicles where the rear end of the slidable roof panel is to be raised and lowered when the panel is in the closed position. The invention particularly relates to sliding roofs with brake rods which are movable transversely to the direction in which the panel moves between the closed and an open position.

2. Description of the Prior Art

In a known arrangement of the above-mentioned type, the ends of the brake rods have been equipped with rollers which, when moved outwardly, run on two surfaces sloping outwardly and upwardly so that, when the roof is being closed, they cause raising of the panel, followed by its clamping fast in a closed and raised position. However, these known raising and clamping devices require the application of considerable force for their operation.

SUMMARY OF THE INVENTION

The object of the present invention is to replace the known devices by an improved device which requires less force both for the raising and for the lowering operations.

With this end in view, the invention suggests a lifting and clamping device for rigid automobiles sliding roofs with a roof panel slidable into and out of a roof aperture between the closed and an open position, comprising two brake rods, movable transversely to the direction of the sliding movement of said panel, wherein near one end of each said brake rods a lever means is articulated, and the two lever means for raising and lowering the rear end of said panel in the closed position co-operate with fixed support means preferably disposed in a rain channel.

As compared with the use of run-up rollers in known devices the device according to the invention utlizes substantially longer levers than is possible with the use of rollers, where only the radius of the rollers acts as a lever, and consequently the application of less force is required in operation.

The lifting operation can be additionally facilitated if in accordance with a further feature of the invention each of the lever means is equipped on its end remote from its pivot with a finger which extends in the direction of the panel closing movement, and which, in the closed panel position projects into a cutout, for example a slot. When the finger is in the cutout, constrained control is obtained in the lowering of the panel, so that the springs, usually used hitherto for this purpose, and the resulting force which has to be overcome when lifting the cover, can be dispensed with. In order to make the highest position of the panel adjustable in relation to the fixed roof curvature, each of the lever means may be mounted on the corresponding slidable brake rod so as to be adjustable in the direction of movement of the latter.

A further feature of a device according to the invention consists of the provision of spring means which urges the lever means to swivel upwards in the direction of the brake rod. This spring is provided mainly to avoid possible rattling noise caused by the lever, and may accordingly be comparatively weak, so that the overcoming of its force in the lifting operation is by no means as important a factor as the powerful springs previously necessary for the lowering of the panel, which have to permit the lowering of the panel when the vehicle is travelling at high speed and thus with a high negative pressure over the panel area.

BRIEF DESCRIPTION OF THE DRAWING

A preferred form of a device according to the invention is shown in the drawings, where.

DESCRIPTION OF THE PREFERRED EMBODIMENT

Figure 1:
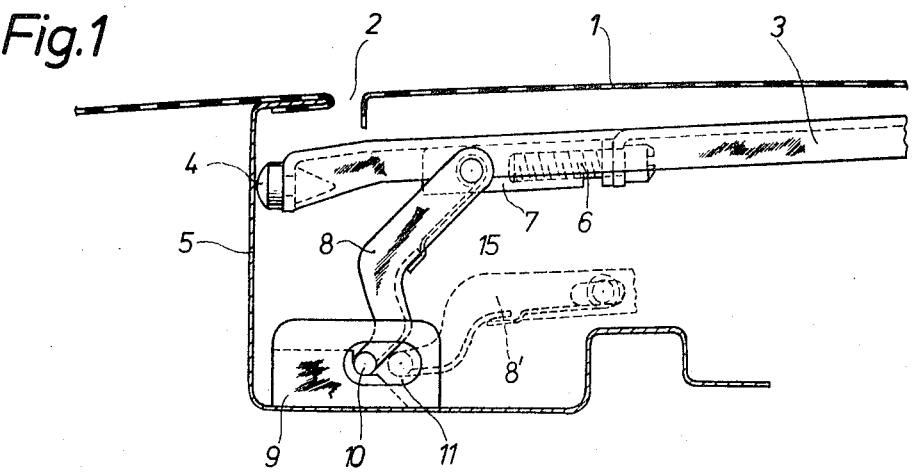
FIG. 1 is a partial vertical cross section through one side of a roof frame near the rear end of the roof aperture.
Figure 2:
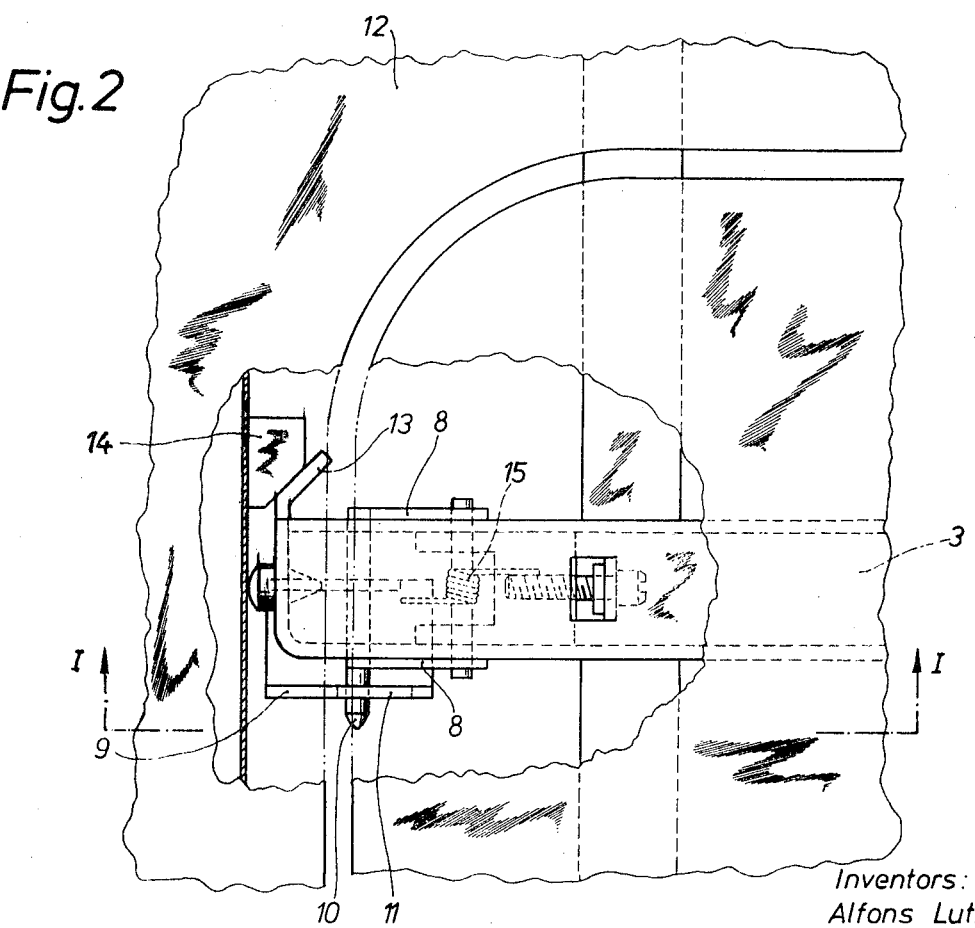
FIG. 2 is a partial plan view of the clamping and lifting device illustrated in FIG. 1.

As can be seen in the drawing, on the sliding panel 1, which is shown in the closed and raised position inside a roof aperture 2, there is slidably mounted on each side a brake or clamping rod which is designated by the reference 3 in the FIG. 1. At the end of this slidable rod 3 is provided a brake buffer 4, which together with a second buffer (not shown), provided on the other side of the panel and fastened on a similar rod, retains the slidable cover panel 1 by clamping friction against the side wall of the rain channel 5. On the brake rod 3 a lever 8 is pivotally mounted in a member 7 which by means of a screw 6 is adjustable in the longitudinal direction in relation to said brake rod. The other end of the lever 8 is supported in a bracket 9, so that the slidable cover 1 is held in the closed position illustrated in FIG. 2 in the plane of the roof curvature, with the brake rods clamping it sideways. In this position a finger 10 provided at the lower end of the lever 8 projects into a slot 11 of bracket 9. When the brake rods 3 are retracted, the finger 10 is first moved horizontally inwardly in the slot 11, as far as the end of the latter, (on the right as seen in the drawing) and when the finger 10 reaches this limit the lever 8 pivots downwardly and consequently the brake rod 3 and the cover 1 are lowered by forcibly into the position 8' shown in broken lines. The sliding cover can now be pushed under the fixed roof part 12 in the direction of the arrow I shown in FIG. 2, the finger 10 thus being moved out of the slot 11. The closing and raising operation takes place in the reverse manner, the finger 10 first sliding into the slot 11. The lifting and clamping by means of the buffer 4, in the manner described above, is effected on the outward movement of the brake rod 3, in conjunction with the supporting of the lever 8 in the bracket 9. In addition, there may be provided on the brake rod 3 an inclined surface 13, which slides against a fixed cam 14 when the panel lifting and clamping mechanism is operated while the panel is still in a partially open position, thereby pushing the sliding panel 1 forwards in a direction opposite to the direction of the arrow I, during the final stage of a panel-closing operation. In contrast to the rollers of the prior art, the abovedescribed arrangement provides the advantage that this final forward movement is opposed with only slight resistance by the pin at the end of the lever 8, since during this forward movement the pin slides on the support, whereas hitherto the roller pressed against an inclined surface and had to be moved laterally, which required additional force for the closing of the roof.

A spring 15 biases the lever 8 upwardly in the direction of the brake rod 3 and thus eliminates any possible rattling noise, particularly when the panel 1 is in the lowered, pushed-back position.

The invention is not restricted to details of the example illustrated, but may be modified and supplemented in various ways without departing from the scope of the invention.

We claim:

1. A device for lifting and clamping the sliding roof panel of a rigid automobile sliding roof in its closed position within the roof aperture comprising:

two oppositely extending, generally horizontal and longitudinally displaceable clamping rods carried by the sliding roof panel in a horizontally guided and vertically constrained relationship thereto;

attached to each clamping rod a lever whose one end forms a horizontal pivot connection with the clamping rod at a distance from the outer rod end, and whose opposite free end extends below the clamping rod;

means for pivoting the levers in response to the clamping rod displacement so as to raise and lower the clamping rods and the roof panel, when the latter is positioned within the roof aperture and the clamping rods are extended and retracted, respectively;

the pivoting means being in the form of a bracket for each lever which is fixedly mounted on the fixed roof structure and which engages the lever by forming a one-sided horizontal pivot support for the free end of the lever.

2. A device as defined in claim 1, wherein
the pivoting means are in the form of a bracket for each lever which is mounted on the fixed roof structure and which forms a disengageable horizontal pin-and-hole pivot connection with the free end of the lever.

3. A device as defined in claim 2, wherein
the disengageable pin-and-hole pivot connection includes a vertical wall portion in the bracket with a horizontal pivot hole therethrough, and a horizontal pin extension on the free end of the lever which is so arranged that it engages the pivot hole when the roof panel is positioned within the roof aperture and is disengaged from the pivot hole when the roof panel is shifted from the roof aperture.

4. A device as defined in claim 2, wherein
the pivoting means further includes a spring for each lever biasing it upwardly around its pivot connection with the clamping rod.

5. A device as defined in claim 1, further comprising:
lateral abutments as part of the fixed roof structure which cooperate with the outer ends of the two clamping rods to produce a lateral clamping effect between the sliding roof panel relative and the roof structure, when the clamping rods are fully extended.

6. A device as defined in claim 5, further including:
means for adjusting the upper end position taken by the sliding roof panel relative to the fixed roof structure, when the sliding roof panel is raised and clamped laterally by the clamping rods.

7. A device as defined in claim 6, wherein
the adjustment means is arranged at the pivot connections between the clamping rods and levers in such a way that the pivot point is shiftable relative to the clamping rod.

8. A device as defined in claim 5, further comprising:
means for checking the fully closed horizontal position of the sliding roof panel inside the roof aperture, when the panel is lifted and laterally clamped.

9. A device as defined in claim 8, wherein
the checking means include cooperating cam surfaces on the clamping rods and fixed roof structure which cause the sliding panel to move into the fully closed position from a position nearby, in response to the extension of the clamping rods.

* * * * *